Feb. 26, 1929.
F. S. SMITH
1,703,409
HIGH VOLTAGE TERMINAL
Filed March 2, 1921
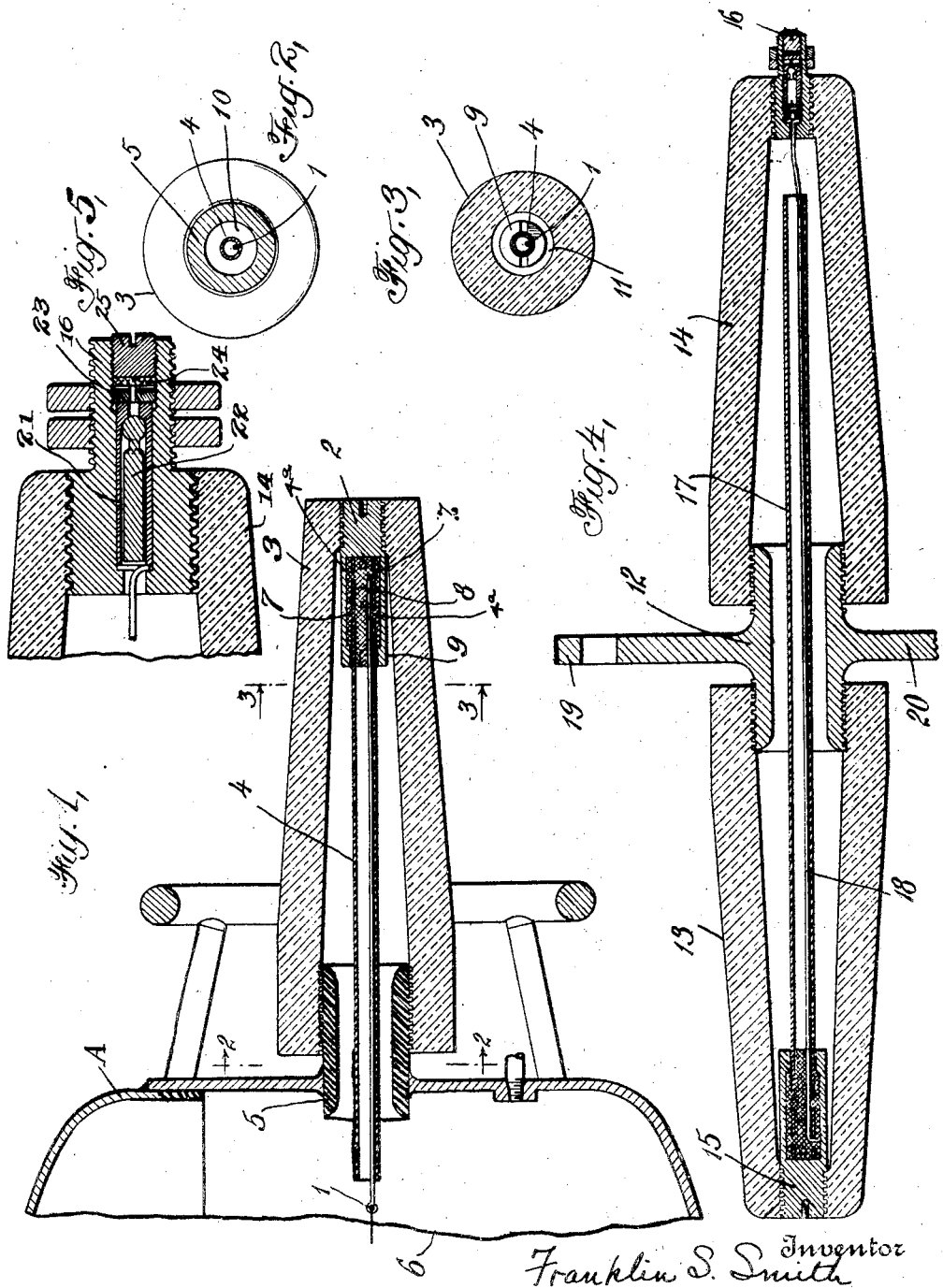
Inventor
Franklin S. Smith
By his Attorney's
Pennie, Davis, Marvin and Edmonds.

Patented Feb. 26, 1929.

1,703,409

UNITED STATES PATENT OFFICE.

FRANKLIN S. SMITH, OF PHILADELPHIA, PENNSYLVANIA, ASSIGNOR TO THE PRODUCTS PROTECTION CORPORATION, OF NEW YORK, N. Y., A CORPORATION OF DELAWARE.

HIGH-VOLTAGE TERMINAL.

Application filed March 2, 1921. Serial No. 449,212.

This invention relates to high voltage terminal construction.

One of the objects of this invention is to provide a terminal construction particularly adapted for use in connection with high voltage electrical installations where efficient and effective insulation of a high voltage lead is required. Another object of this invention is to provide a simple and practical terminal construction by means of which electrical energy at relatively high voltage may be safely and dependably passed through a wall or casing and which will be of inexpensive construction and reliable action under the varying conditions of hard practical use. Other objects will be in part obvious or in part pointed out hereinafter.

As conducive to a clearer understanding of certain aspects of this invention, it may at this point be noted that, in high voltage electrical installations, not the least difficult problem resides in effecting a dependable and permanent insulation of a high voltage conductor from, for example, the wall or body through which the conductor is to be passed. Such difficulties as these, and which, as will be clear, increase in magnitude as the voltages dealt with increase, I am enabled to greatly minimize, if not entirely surmount, and as illustrative of certain features of my invention whereby such difficulties are effectively overcome, I may note that I prefer to employ an arrangement in which the high tension lead to be insulated is passed through and centrally supported in spaced relation with respect to a tube-like bushing of electrically conductive material, the latter being in conductive relation to and preferably attached to or forming part of the wall or body from which the high tension lead is to be insulated while the outer surface of the lead is separated from the inner surface of the tube-like bushing by a suitable gaseous dielectric; I further employ a housing consisting of a tube or tubes of solid dielectric material for centrally supporting the high tension lead as above-mentioned, and also as a container for the gaseous dielectric. Moreover, the relative arrangement of the tube-like bushing of conducting material and of the housing of dielectric material, with respect to each other and to the high tension lead, is such that the potential gradient across all parts of the housing of dielectric material is low, while the potential gradient across the gaseous dielectric between the tube-like bushing of conducting material and the high tension lead is high.

A high tension terminal, constructed in the manner described above, may also serve as a safety device to protect the apparatus or installation with which it is associated; and to this end preferably the radius of the outer surface of the lead and the radius of the inner surface of the metallic bushing are so chosen as to produce a fast discharge gap (that is, a gap which will arc-over without preceding corona), which will have a critical voltage less than that voltage which would injure any part of the apparatus or installation associated with the terminal. With such a gap, injuriously high voltages will almost always be discharged at this point (at the gap) and as soon as the disturbing conditions have been removed, the gaseous dielectric, which is in no way destroyed by the discharge, will automatically re-establish the insulation between the lead and the inner surface of the bushing of electrically conductive material. In this way the self-restoring characteristics of the gaseous dielectric cooperate indefinitely with the structure of the terminal to protect from injury any apparatus or other installation with which the terminal is associated.

Further elements of safety may be achieved, according to the invention, by so supporting the high tension lead that, upon occurrence of excessive temperatures, it will fall against or toward the surrounding bushing, thereby short-circuiting the apparatus; and by so cementing the separable parts of the terminal that, upon the occurrence of high temperature and accompanying rise in pressure, a discharge opening for the gaseous dielectric will be afforded, all as hereinafter described more in detail.

The invention accordingly consists in the features of construction, combinations of elements, and arrangements of parts as will be exemplified in the structure to be hereinafter described and the scope of the application of which will be indicated in the following claims.

The invention has been illustrated in the accompanying drawing as applied to a transformer in which a gaseous dielectric is employed, as described in my co-pending application, Serial No. 410,279, filed September 14, 1920, and also as illustrative of its embodiment in a high voltage entrance of general application, as for example, for passing a high voltage conductor through a wall.

Figure 1 is a vertical sectional view of a high voltage terminal embodying my invention and having one end thereof open to the interior of a transformer casing provided with a gaseous dielectric;

Figure 2 is a sectional view of the terminal taken along the line 2—2 of Figure 1, and Figure 3 is a sectional view of the terminal taken along the line 3—3 of Figure 1.

Figure 4 is a vertical sectional view of a terminal embodying my invention and adapted to a wall entrance; and Figure 5 is a longitudinal sectional view but on an enlarged scale showing the upper end portion of the structure shown in Figure 4.

Referring now to the drawing and more particularly to Figure 1, there is shown a transformed casing A which is hermetically sealed and filled with a gaseous dielectric as described in my above-mentioned co-pending application; a high tension conductor or lead 1, leading from the high tension side of the apparatus within the casing A, such as, for example, the one side of the high tension winding of the transformer, is brought out through the wall of the transformer casing A and is anchored in a terminal plug 2 at the outer end of a tube-like housing 3 of solid insulating material. In this plug 2 there is also anchored the outer end of a metallic tube 4 with which the lead 1 is in electrical contact and, as shown in the drawing, through which the lead 1 passes. The purpose of this metallic tube 4 is, in effect, to increase the radius of the conductor 1 and to give it the correct proportions for the desired fast gap. The tube 4 may be dispensed with if the conductor or lead 1 has or is given the necessary or appropriate radius and rigidity, although the tube 4 has many constructional advantages, being, for example, easily provided with a polished surface of exact curvature, etc. The metallic tube 4 containing the conductor 1 passes centrally through a metallic tube or bushing 5 welded in the side of the transformer casing A, the tube 4 being separated from the inner surface of the bushing 5 by an annular space which is in open communication with the interior of the transformer casing so that when the casing A is filled with a gaseous dielectric, the space between the tube 4 and the inner surface of the bushing 5 will also be filled with this dielectric. This annular space between the metallic tube 4 and the bushing 5 is clearly illustrated in Figure 2. In its broader sense, the term "lead" employed herein includes both the wire or conductor 1 and the metallic tube 4.

The configuration of the gap formed by the tube 4 and the bushing 5 is such that corona does not precede spark-over, that is, it is a "fast" gap; and the parts are preferably so proportioned that the gap will arc-over at a potential difference less than that which would injure the transformer within the casing A. In this way, a safety device is provided which protects the conductors and the solid dielectric of the transformer 6 from destruction, upon the occurrence of excessive potential differences. When a dangerous potential difference occurs, it breaks down the gaseous dielectric between the fast gap electrodes and permits the discharge of the high potential to ground through the grounded transformer casing A.

The outer end portion of the tube 4 projects into a chamber 8 in the inner end portion 9 of the terminal plug 2, the outer end of the latter being screw-threaded and in engagement with an internally screw-threaded opening in the outer end of the tube-like housing 3, the latter consisting of a solid dielectric such as molded bakelite. In order that the screw-threaded connection between the plug 2 and the outer end of the tube 3 may be air-tight, a suitable cement may be inserted between the threads. The cement may be of such a character as either to become brittle or to melt and be blown out by excess pressure when over-heated; in either case, the escape of gaseous dielectric will be permitted to take place.

The metallic tube 4 is anchored in the chamber 8 of the plug 2 by a low melting alloy indicated at 7 and retains the metallic tube 4 in proper fast-gap relation with the inner surface of the bushing 5. If, therefore, the terminal construction becomes over-heated by fire, or the like, the low melting alloy will soften or melt and allow the metallic tube 4 to fall into contact with the bushing 5, thereby forming a short-circuit which will serve to actuate the circuit breakers and open the circuit in which the transformer is included. The tube-like housing 3, at its inner end, has a screw-threaded connection with the projecting end of the bushing 5, the latter being secured in a suitable opening in the transformer casing A, by welding, and the welded joint being air-tight. At this screw-threaded connection, a blow-out cement may also be used.

In Figure 4 a construction of terminal is shown in which the invention is adapted to a wall entrance. The terminal construction will be seen to include a central metallic tube or bushing 12 having two tube-like housings 13 and 14, each of dielectric material, affixed thereto, one on each end of the bushing 12. The tube 13 is provided with a terminal plug 15 like the plug 2 of Figure 1 and supports in like manner the metallic tube 17 which is in electrical contact with the high tension lead 18. The tube-like housing 14 is provided with a plug generally indicated at 16 in Figure 4 and provided with valve mechanism to permit the charging of the terminal with a suitable gaseous dielectric. This valve mechanism, as is more clearly shown in Figure 5, consists of a cylindrical valve body 21 carrying a ball valve 22 which controls a gas passage through the plug 16, the passage being plugged after charging with the gaseous dielectric by means of a screw plate 23, and a body of packing material 24 and a screw plug 25.

As in the case of the construction shown in Figure 1, the outer surface of the metallic tube 17 and the inner surface of the tube-like bushing 12 are the two electrodes of the fast gap, and here also, as in the construction of Figure 1, the additional safety features are afforded by the fusible support of the tube 17 with respect to the terminal plug 15 and by using a cement at the various screw-threaded joints of such character that the cement will become brittle or will melt and be blown out by excess pressure when over-heated. The cement as employed between the plug 2 and the tube-like housing 3 (of Figure 1) and between the plug 15 and the tube-like housing 13 (of Figure 4) is the same as that employed between the plug 16 and the tube-like housing 14, as is more clearly shown in the enlarged view of Figure 5.

For the purpose of attaching the construction above described in connection with Figure 4 to a wall or to the body through which the conductor or lead is to pass, it is convenient to provide the bushing 12 with an extended flange 19—20 as shown in Figure 4.

While certain embodiments of the invention have been illustrated and described herein, it is to be understood that the terminal is capable of many modifications involving various forms of gaps, and that the general structural arrangements of the terminal may be varied without departing from the spirit and scope of this invention. When the invention is applied to a transformer casing, as illustrated in Figure 1, I prefer to use the gaseous dielectric described in my co-pending application, Serial No. 410,280, filed September 14, 1920, consisting of a mixture of helium and nitrogen or equivalent gases; but in the wall bushing, as illustrated in Figure 4, where the energy to be dissipated as heat is insignificant or practically nil, the use of helium is unnecessary. In the case of occasional internal sparkover, across the gap provided, in this latter construction, the energy to be dissipated is intermittent; therefore the thermal characteristics of helium are not required and in most cases other suitable gaseous dielectrics, such as nitrogen or carbon dioxide will answer.

Inasmuch as the dielectric strength of a gaseous dielectric is proportional to its density, it is advisable to employ in the terminal construction above described a gaseous dielectric under pressure, and it will be seen that the structure described lends itself to that purpose. By way of example, a pressure on the order of ten atmospheres may be employed. The form of gap and the degree of pressure employed will depend upon the dimensions of, and conditions of use of, the terminal construction, as will be understood. By way of explanation merely, it might be noted at this point that by the term "density" is not meant such a characteristic of a gas as is otherwise known as its specific gravity or its molecular weight, but rather the "denseness" of the gas or the number of molecules of the gas per unit volume. Thus, increasing the number of molecules of the gaseous dielectric per unit volume increases its dielectric strength and, as pointed out in both of my above-mentioned co-pending applications, increasing the density of the gas increases its thermal capacity. It will therefore be seen that by placing the gaseous dielectric under pressure, the molecular content per unit volume of the gas is increased and both its dielectric strength and thermal capacity are increased. Aside from the particular dielectric strength of the gaseous dielectric which may be required by conditions of use, it will also be seen that the thermal capacity of the gaseous dielectric may be a factor entering into the conditions of use; such will be seen to be the case, as already hereinbefore made clear, where my invention is embodied in connection with, for example, a transformer and its casing.

In the constructions shown both in Figures 1 and 4, and as will be clear in view of what has hereinbefore been set forth and also from the drawing, to those skilled in the art, the proportion of the gaseous dielectric to the solid dielectric of the housing 3 (of Figure 1) or of the housings 13 and 14 (of Figure 4) increases as the voltage gradient of the dielectric field increases. The proportional dielectric flux distribution and appropriate voltage gradients will be apparent from the drawing to those skilled in the art.

With the construction described above and typified by that shown in Figure 1, the potential gradient across all parts of the housing 3 of dielectric material is low, while the potential gradient across the gaseous di-electric between the tube-like bushing 5 of conductive material and the high tension lead 4 is high; this results in part from the fact that the gaseous dielectric under pressure has a permitivity, or specific inductive capacity, slightly greater than unity, while the permitivity or specific inductive capacity of the tube-like housing 3, where the latter is made of bakelite as hereinabove mentioned, is considerably greater, for example, on the order of 6. Moreover, as will be clear from the drawing, the solid and gaseous dielectrics employed will be seen to be combined both in multiple and in series; thus, the solid dielectric, represented by the tube 3, extends from the outer end of the high tension lead 4 to the grounded bushing 5, while the gaseous dielectric alone extends between the inner end portion of the high tension lead 4 and the interior surface of the bushing 5. The solid dielectric and the gaseous dielectric will thus be seen to be combined in multiple, the former being in that part of the field which is of lowest average voltage gradient while the latter extends across that part of the field which is of highest voltage gradient. Taking a point on the high tension lead 4 which is adjacent the approximate center of the tube 3 (considered in the direction of the axis of the tube 3), the dielectric field between that assumed point on the high tension lead 4 and the bushing 5 will be at an average voltage gradient somewhere intermediate of the lowest and highest average voltage gradients above-mentioned and in this intermediate field, there will be seen to be present the gaseous dielectric and the solid dielectric arranged in series, for, a flux line, in passing from the above-assumed point in the high tension lead 4 to the bushing 5 will pass first through the gaseous dielectric and thence through the solid dielectric (of the tube 3) in a downwardly inclined direction toward the bushing 5. It will thus be apparent that there has been brought about such a distribution of voltage gradients that, because of the fact that the field of highest average voltage gradient is substantially concentrated in the gaseous dielectric between the high tension lead 4 and the bushing 5, the average voltage gradient between the external outer end portion of the high tension lead 4 (the terminal plug 2, for example) is so low that external spark-over between the terminal plug 2 and the bushing 5 is precluded because of the great decrease in the dielectric stress to which the external air is subjected. It will, moreover, be seen that the above-mentioned redistribution of voltage gradients is obtained by a construction which is simple and durable, free from complication and multiplicity of parts, capable of inexpensive manufacture and capable also of rapid assembly, and that, moreover, such advantages as these are achieved without impairment of the tightness of the apparatus with respect to the gaseous dielectric under pressure contained therein. It will thus further be seen that while the above-described desirable distribution of dielectric stresses is achieved, this latter advantage is accomplished by a structure which also lends itself readily to the use of a gaseous dielectric under pressure.

As will be seen by reference to both Figures 1 and 4, the preferred embodiment of my invention is one in which the high voltage lead, represented by the tube 4 of Figure 1, and represented by the tube 18 of Figure 4, is supported at one end by a connection with the end portion of the dielectric tubular housing. This arrangement is of peculiar advantage because differences in rates of expansion or contraction under changes in temperature of the apparatus can bring about no detrimental effects. Referring, for example, to Figure 1, it will be noted that the high tension member such as the tube 4 and its associated metallic parts, is supported from that end of the solid dielectric housing 3 which is remote from the casing A of the transformer through which the high tension member passes, while the inner end of the high tension member, that is, the inner end of the tube 4, is unrestricted with respect to movements thereof in the direction of the axis of the tube 4. Expansions or contractions of the bakelite housing 3 and of the high tension metallic member 4 but in unlike degree or extent may thus freely take place when changes in temperature occur but without impairment of the tightness of the construction against leakage of the gaseous dielectric under pressure. In the embodiment of my invention shown in Figure 4, it will be seen that the construction is also of such a nature as to achieve such advantages as these just noted.

Referring again to Figure 1, it will be noted that the end portion of the metallic tube 4, which end portion is received within the chamber 8 of the plug 2, is provided with a number of openings or apertures 4ª, and it will also be seen that the inner or left-hand or extreme inner end portion of the chamber 8 is restricted so that the metallic tube 4 may be passed through this restricted end portion. It will also be noted that the relative dimensions of the chamber 8 and of the tube 4 received therein are such that there will be present a marginal space between the tube 4 and the inner walls of the chamber 8. Throughout the spaces and also through the openings 4ª in the tube 4 thus formed, it will be seen that the alloy 7 penetrates and securely interlocks the tube 4 with the plug 2. The conductor 1 passing through the tube 4 will be seen also to be embedded in the alloy 7 so that the conductor 1 is not only securely anchored but is also made to effect a good electrical connection with the plug 2 and its associated parts. Some of the advantages of making the member 4 in the form of a tube have been hereinbefore noted and it might at this point be further pointed out that another thoroughly practical advantage in this form of construction resides in the fact that, in assembling the tube 4 with respect to its associated parts, the alloy 7 may be conveniently transferred into the chamber 8 by passing it in molten condition into the free or open end of the tube 4.

It will thus be seen that there has been provided in this invention a high tension terminal construction in which the several objects hereinbefore noted, together with many thoroughly practical advantages are successfully achieved. It will also be seen that the construction is of a thoroughly practical nature, and is well adapted to meet the various conditions of hard practical use.

I claim:

1. In a high voltage terminal, in combination, a housing of dielectric material, a bushing of electrically conductive material extending into said housing and interlocked with said housing at one end of the latter, a high voltage lead extending substantially centrally of the conductive bushing and supported from the other end of the housing of dielectric material, and a gaseous dielectric under pressure filling the space between the outer surface of the high voltage lead and the inner surface of the conductive bushing and filling the space between the high voltage lead and said housing.

2. In a high voltage terminal, in combination, a unitary housing of dielectric material, a bushing of electrically conductive material at one end of said housing and extending into the latter, a high voltage lead supported substantially centrally of the conductive bushing by the housing of dielectric material, portions of said housing being spaced about said lead forming an intervening space therebetween, and a gaseous dielectric under pressure filling the space between the outer surface of the high voltage lead and the inner surface of the conductive bushing, and filling the said intervening space between said lead and said housing, the relative arrangement of the parts being such that the potential gradient across all parts of the housing of dielectric material is low, while the potential gradient across the gaseous dielectric between the high voltage lead and the conductive bushing is high.

3. In a high voltage terminal, in combination, insulating means of solid dielectric material, an electrically conductive portion, and a high voltage lead supported by said insulating means and positioned in predetermined discharge gap relation to said conductive portion, the gap being filled with a gaseous dielectric under pressure and said discharge gap relation being such that arc-over occurs without preceding corona.

4. In a high voltage terminal, in combination, an electrically conductive portion, a housing of dielectric material, a high voltage lead, and means including an easily fusible alloy for supporting said lead from said housing in predetermined discharge gap relation to said conductive portion, the gap being filled with a gaseous dielectric, whereby, upon said alloy giving way, said predetermined relation between said lead and said conductive portion is changed to effect a discharge therebetween.

5. In a high voltage terminal, in combination, an electrically conductive portion, and a non-conductive portion, a high voltage lead, means for supporting said lead in predetermined discharge gap relation to said conductive portion, the gap being filled with a gaseous dielectric under pressure, said non-conductive portion of the terminal being united to said means by a cement which at high temperature will break down and be blown out to permit the gaseous dielectric to escape.

6. A high voltage terminal having connection with an electrically conductive body and comprising a high voltage lead, a bushing of electrically conductive material in conductive relation to the said body from which the lead is to be insulated, a tubular housing of solid dielectric material, said lead being supported from one end of said housing and extending into predetermined discharge gap relation to said bushing, and a gaseous dielectric under pressure filling the housing and the said gap, said predetermined discharge gap relation between said lead and said bushing being such that arc-over occurs without preceding corona.

7. A high voltage terminal including a housing of dielectric material filled with a gaseous dielectric under pressure and having means forming a fast discharge gap therein.

8. In a high voltage terminal, in combination, a high voltage lead, a sealed tube of dielectric material about said lead and filled with a gaseous dielectric under pressure and having means forming a fast gap open to said dielectric, and means for supporting said lead in said tube.

9. In a high voltage terminal, in combination, a lead, a metallic bushing, a sealed tube of dielectric material surrounding said lead affixed and sealed to said bushing and filled with a gaseous dielectric under pressure, the diameter of the interior of said bushing and the diameter of said lead being so proportioned to each other as to produce a fast discharge gap between the inner surface of the metallic bushing and the outer surface of the lead and open to said dielectric, and means for supporting said lead in said tube.

10. In a high voltage terminal having connection with an electrically conductive body, in combination, a lead including a wire adapted to form part of a high voltage circuit, and a rigid tubular conductor surrounding said wire and in contact therewith, a metallic bushing in conductive relation to the said body and from which body said lead is to be insulated, a sealed tube-like housing of solid dielectric material surrounding the said lead and affixed and sealed at one end thereof to the said metallic bushing, the said tube being filled with a gaseous dielectric under pressure, the outer surface of the tubular conductor and the inner surface of the said metallic bushing being shaped and spaced to form a fast discharge gap open to the gaseous dielectric, which gap will arc over at a predetermined potential difference between said tubular conductor and the said metallic bushing, and means at the other end of said housing for supporting said tubular conductor and for making electrical connection thereto from the exterior of said housing.

11. In high voltage terminal construction, in combination, a high voltage rigid conductor, a conductive member having an opening therein through which said conductor passes and from which said conductor is to be insulated, and a tube-like housing of solid dielectric material for supporting and insulating said conductor with respect to said member, said housing being spaced around said conductor and filled with a gaseous dielectric under pressure, said conductor, said member, and said housing being shaped to effect an interlocking engagement between said member and one end of said housing and between said conductor and the other end of said housing.

12. A high voltage terminal filled with a gaseous dielectric under pressure, the said terminal comprising a metallic bushing and a lead which extends centrally through the said bushing, the radii of the lead and of the inner surface of the bushing being such as to produce a fast discharge gap having a critical voltage less than that voltage which would injure the electrical installation with which the said terminal is associated.

13. In high voltage terminal construction, in combination, a high voltage lead member; a member having an opening therein and through which said lead member is adapted to be passed; means for supporting and insulating said lead member from said second-mentioned member including a housing member of solid dielectric material about said lead and secured to said second-mentioned member, said supporting and insulating means including means adapted upon a predetermined rise in temperature to break down and permit a change in the relation of one of said members with respect to another of said members to take place, and a gaseous dielectric within said housing member and about said lead, said gaseous dielectric comprising a mixture of gases, one of which is of high dielectric strength and another of which is of high thermal conductivity.

14. A high voltage terminal having an electrically conductive portion, and a high voltage lead supported in predetermined discharge gap relation to said conductive portion, the gap being filled with a gaseous dielectric under pressure, and means adapted upon a predetermined rise in temperature to permit escape of said dielectric.

15. In a protective device for high voltage electrical apparatus, in combination, means including a gaseous dielectric under pressure and a pair of electrodes supported in said gaseous dielectric but in predetermined discharge gap relation with respect to each other and adapted to arc-over at a critical voltage less than that voltage which would injure the electrical apparatus associated with said electrodes, and means responsive to a predetermined rise in temperature adapted to permit escape of said gaseous dielectric, whereby arcing-over may take place at a still lesser voltage.

16. A high voltage terminal including a high voltage conductor and a conductive member through which said conductor passes, and means for insulating said conductor from said member, said means comprising a tubular housing of solid dielectric secured at one end thereof to said member and supporting said conductor in depending relation and a gaseous dielectric under pressure, said conductor and said tubular housing being dimensioned to provide an intervening space therebetween for accommodating said gaseous dielectric under pressure, and said dielectrics being related one to the other so that the proportion of gaseous dielectric to solid dielectric increases as the average voltage gradient of the dielectric field between said conductor and said member increases.

17. In high voltage terminal construction, in combination, a high voltage conductor and a conductive member having an opening therein through which said conductor passes; means for insulating said conductor from said member, said means including a substantially tubular housing of solid dielectric material arranged to project away from said member and having said conductor supported therefrom in depending relation, and a gaseous dielectric under pressure, said housing being spaced about said conductor for accommodating said gaseous dielectric therebetween and being shaped and related with said gaseous dielectric to said conductor and to said member so that the proportion of gaseous dielectric to solid dielectric increases as the average voltage gradient of the dielectric field between said conductor and said member increases; means connecting said housing to said member in fluid-tight relation; and means on that side of said member remote from said housing for preventing escape of said gaseous dielectric.

18. In high voltage terminal construction, in combination, a tubular conductor, a member having an opening therein through which said conductor passes and from which member said conductor is to be insulated, a substantially tubular housing of solid dielectric material associated with said member and extending in a direction away from the opening therein, and means for supporting said tubular conductor at the remote end of said housing, said means including a metallic member passing through the remote end of said housing and provided with a recess at its inner end for receiving said tubular conductor, said recess being of greater lateral dimension than the diameter of said tubular conductor and said tubular conductor having an aperture in the wall of that portion thereof received within the recess, and a metal filling the space between the walls of said recess and the walls of said tubular conductor and also the aperture in the latter, in order thereby to anchor said conductor within said metallic member.

In witness whereof I affix my signature.

FRANKLIN S. SMITH.